US010123005B2

(12) United States Patent
Gu et al.

(10) Patent No.: US 10,123,005 B2
(45) Date of Patent: Nov. 6, 2018

(54) DISPLAYS WITH UNIT-SPECIFIC DISPLAY IDENTIFICATION DATA

(71) Applicant: Apple Inc., Cupertino, CA (US)

(72) Inventors: Mingxia Gu, San Jose, CA (US); Andrew P. Aitken, Sunnyvale, CA (US); Bongsun Lee, Cupertino, CA (US); Gabriel Marcu, San Jose, CA (US); Ian C. Hendry, San Jose, CA (US); Jun Qi, Cupertino, CA (US); Victor H. Yin, Cupertino, CA (US); Wei Chen, Palo Alto, CA (US); Yanming Li, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/048,365

(22) Filed: Feb. 19, 2016

(65) Prior Publication Data

US 2016/0261860 A1 Sep. 8, 2016

Related U.S. Application Data

(60) Provisional application No. 62/129,663, filed on Mar. 6, 2015.

(51) Int. Cl.
*H04N 9/64* (2006.01)
*H04N 17/04* (2006.01)
*G09G 3/00* (2006.01)

(52) U.S. Cl.
CPC ............. *H04N 17/04* (2013.01); *G09G 3/006* (2013.01); *G09G 2320/029* (2013.01);
(Continued)

(58) Field of Classification Search
CPC ................... G09G 3/006; G09G 2320/0693
See application file for complete search history.

(56) References Cited

U.S. PATENT DOCUMENTS

| | | | | |
|---|---|---|---|---|
| 5,739,809 A | * | 4/1998 | McLaughlin | G06F 3/04842 345/594 |
| 6,559,826 B1 | * | 5/2003 | Mendelson | G09G 3/2092 345/102 |

(Continued)

FOREIGN PATENT DOCUMENTS

EP 2200268 6/2010

OTHER PUBLICATIONS

D'Souza et al., "sRGB Color Calibration of Standard Color Displays", 2000, IS&T's 2000 PICS Conference.*

*Primary Examiner* — Phong Nguyen
(74) *Attorney, Agent, or Firm* — Treyz Law Group, P.C.; Kendall W. Abbasi

(57) ABSTRACT

A display may store extended display identification data for communicating the capabilities of the display to a source device such as a graphics processing unit. The extended display identification data may include a red primary color value, a green primary color value, and a blue primary color value. The primary color values in the extended display identification data may be determined during manufacturing. For example, a light sensor may measure the native primary colors of the display, and calibration computing equipment may determine if the native primary colors of the display are within a target color gamut. If the native primary colors of the display are outside of the target color gamut by an amount larger than a threshold, the primary color values in the extended display identification data may be adjusted to account for the color variation.

19 Claims, 13 Drawing Sheets

(52) U.S. Cl.
CPC ............... *G09G 2320/0666* (2013.01); *G09G 2320/0673* (2013.01); *G09G 2320/0693* (2013.01); *G09G 2370/042* (2013.01)

(56) References Cited

U.S. PATENT DOCUMENTS

| | | | |
|---|---|---|---|
| 6,611,249 B1* | 8/2003 | Evanicky | G01J 3/02 345/102 |
| 6,933,967 B2 | 8/2005 | Doyle et al. | |
| 7,079,128 B2* | 7/2006 | Kim | G09G 1/167 345/213 |
| 7,312,779 B1* | 12/2007 | Blevins | G09G 3/3413 345/102 |
| 7,446,761 B2* | 11/2008 | Tseng | G09G 5/003 345/204 |
| 7,893,946 B2* | 2/2011 | Wu | G09G 5/02 345/207 |
| 8,094,166 B2 | 1/2012 | Shyu et al. | |
| 8,244,925 B2* | 8/2012 | Park | G06F 1/3203 710/10 |
| 8,471,841 B2 | 6/2013 | Evanicky et al. | |
| 9,799,305 B2* | 10/2017 | Nasiriavanaki | G09G 5/026 |
| 2003/0058202 A1* | 3/2003 | Evanicky | G09G 3/006 345/82 |
| 2005/0160092 A1* | 7/2005 | Mestha | G01J 3/28 |
| 2006/0170940 A1* | 8/2006 | Kang | H04N 1/6058 358/1.9 |
| 2006/0250412 A1* | 11/2006 | Chen | G06T 11/001 345/589 |
| 2008/0084359 A1* | 4/2008 | Giannuzzi | G09G 5/006 345/1.1 |
| 2009/0027523 A1* | 1/2009 | Chang | H04N 9/3147 348/254 |
| 2009/0213129 A1* | 8/2009 | Li | G06F 1/266 345/544 |
| 2010/0073390 A1* | 3/2010 | Myers | G09G 3/2092 345/581 |
| 2010/0302273 A1* | 12/2010 | Myers | G09G 3/2096 345/593 |
| 2010/0309219 A1* | 12/2010 | Lee | G09G 3/006 345/590 |
| 2011/0122161 A1* | 5/2011 | Lee | H04N 17/02 345/690 |
| 2011/0157212 A1* | 6/2011 | Zhang | H04N 9/67 345/590 |
| 2011/0234644 A1* | 9/2011 | Park | G09G 3/2003 345/690 |
| 2012/0013635 A1* | 1/2012 | Beeman | G09G 3/2003 345/590 |
| 2012/0038688 A1* | 2/2012 | Deyama | G09G 5/02 345/690 |
| 2013/0038241 A1* | 2/2013 | Johannessen | H05B 33/0869 315/294 |
| 2013/0314447 A1* | 11/2013 | Wu | G09G 5/02 345/690 |
| 2014/0009486 A1* | 1/2014 | Matsui | G06T 11/001 345/590 |
| 2014/0118408 A1* | 5/2014 | Lee | G09G 5/02 345/690 |
| 2015/0070402 A1* | 3/2015 | Shah | G09G 3/2003 345/690 |
| 2016/0142693 A1* | 5/2016 | Kwon | H04N 9/73 348/177 |

\* cited by examiner

DISPLAYS WITH UNIT-SPECIFIC DISPLAY IDENTIFICATION DATA

This application claims the benefit of provisional patent application No. 62/129,663 filed on Mar. 6, 2015, which is hereby incorporated by reference herein in its entirety.

BACKGROUND

This relates generally to displays and, more particularly, to displays with unit-specific display identification data.

Displays often store display identification data such as extended display identification data (EDID) as a means of communicating its display capabilities to a source device such as a computer graphics card. The extended display identification data communicates display capabilities such as native resolution, video timing information, color space characteristics, and other information to the source device.

Color space information is captured in the extended display identification data by including primary color values associated with the color space used by the display. For example, the sRGB color space is defined by one set of color primaries (e.g., a red chromaticity value, a green chromaticity value, and a blue chromaticity value), and the DCI P3 color space is defined by a different set of color primaries.

In conventional displays, the primary color values included in the extended display identification data are fixed, predetermined values associated with the color space used by the display. For example, if a display operates in sRGB color space, the extended display identification data file will include the standard red, green, and blue chromaticity values that define the sRGB color gamut.

Such display identification data does not take into account the variation in color capabilities from one display to another. The standard primaries may be adequate for describing the display capabilities of one display operating in a given color space but may be inadequate for describing the display capabilities of another display operating in the same color space.

As it becomes more common for displays to have larger color gamuts, assuming the standard color primaries for all displays that operate in a particular color space may lead to inaccurate color rendering.

It would therefore be desirable to be able to provide improved ways of displaying images with displays.

SUMMARY

A display may store extended display identification data for communicating the capabilities of the display to a source device such as a graphics processing unit. The extended display identification data may include a red primary color value, a green primary color value, and a blue primary color value. The primary color values in the extended display identification data may be determined during manufacturing.

For example, a light sensor may measure the native primary colors of the display, and calibration computing equipment may determine if the native primary colors of the display are within a target color gamut. The target color gamut may be defined by a target red primary color value, a target green primary color value, and a target blue primary color value.

If the native primary colors of the display are within the target color gamut, the primary color values in the extended display identification data may be set to the target red, green, and blue color values.

If the native primary colors of the display are outside of the target color gamut by an amount larger than a threshold, the primary color values in the extended display identification data may be adjusted to account for the color variation. For example, the primary color values in the extended display identification data may be set to the native primary color values measured from the display or the primary color values may be based on which color bins out of a plurality of color bins the measured primary color values are located in. The color bins may be based on previously gathered color data from a plurality of displays.

The extended display identification data may be stored in a timing controller or other memory associated with the display.

Further features of the invention, its nature and various advantages will be more apparent from the accompanying drawings and the following detailed description of the preferred embodiments.

DETAILED DESCRIPTION

Electronic devices such as cellular telephones, media players, computers, set-top boxes, wireless access points, and other electronic equipment may include displays. Displays may be used to present visual information and status data and/or may be used to gather user input data.

Figure 1:
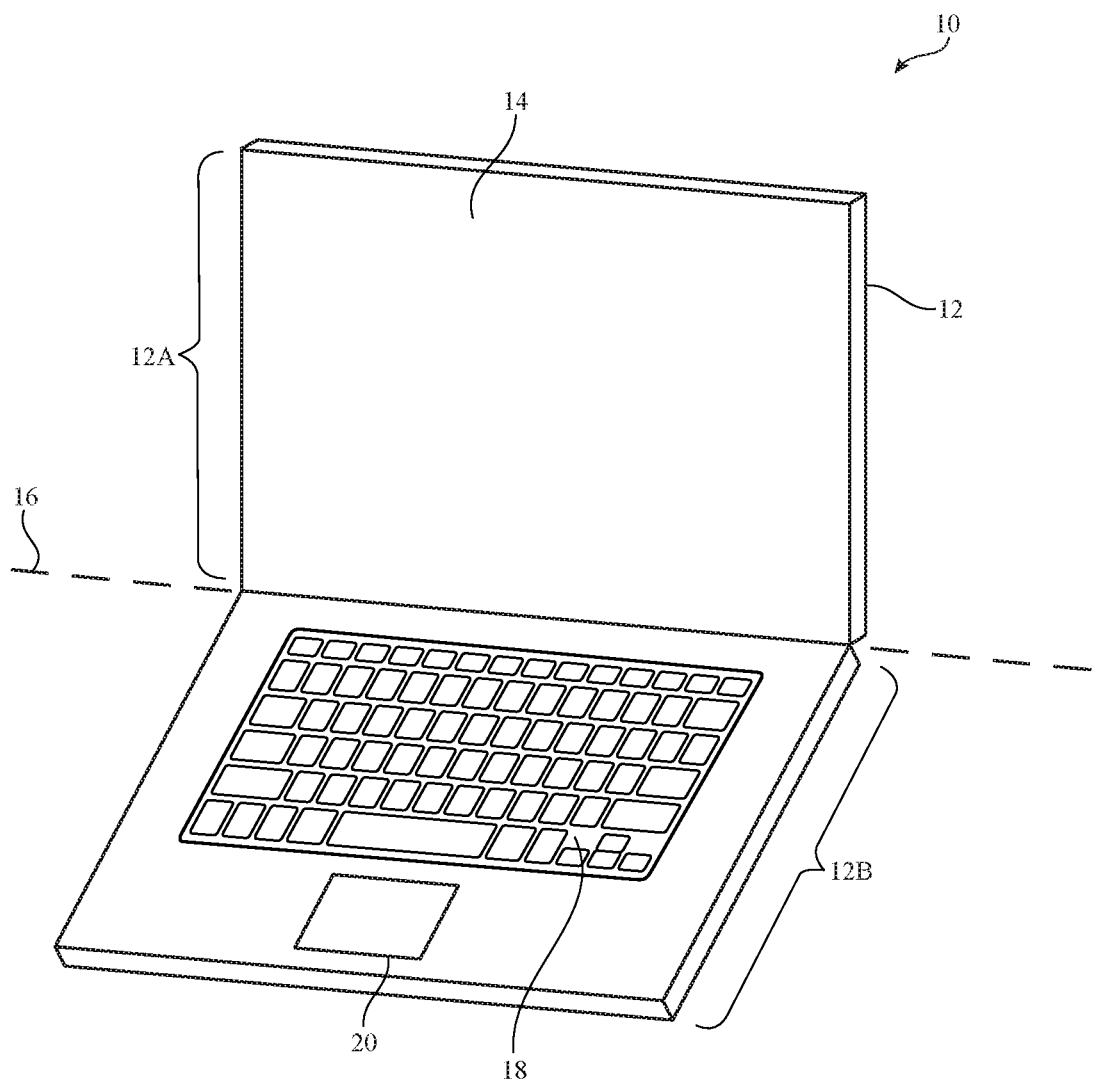
FIG. 1 is a perspective view of an illustrative electronic device such as a portable computer having an ambient light adaptive display in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch-sensitive. Display 14 may include image pixels formed from light-emitting diodes (LEDs), organic light-emitting diodes (OLEDs), plasma cells, electrophoretic display elements, electrowetting display elements, liquid crystal display (LCD) components, or other suitable image pixel structures. Arrangements in which display 14 is formed using organic light-emitting diode pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Figure 2:
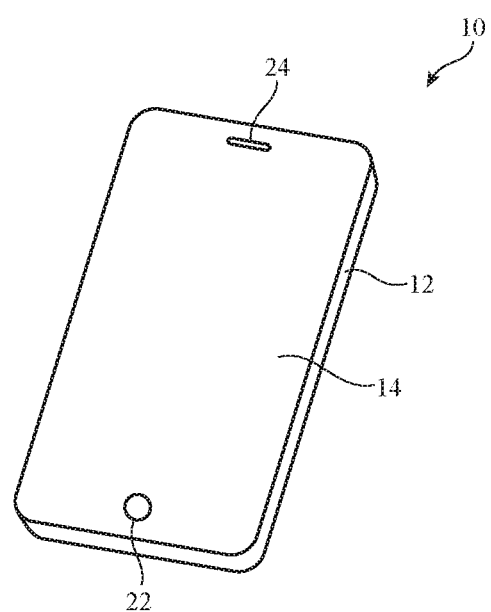
FIG. 2 is a perspective view of an illustrative electronic device such as a cellular telephone or other handheld device having an ambient light adaptive display in accordance with an embodiment of the present invention.

In the example of FIG. 2, device 10 has been implemented using a housing that is sufficiently small to fit within a user's hand (e.g., device 10 of FIG. 2 may be a handheld electronic device such as a cellular telephone). As show in FIG. 2, device 10 may include a display such as display 14 mounted on the front of housing 12. Display 14 may be substantially filled with active display pixels or may have an active portion and an inactive portion. Display 14 may have openings (e.g., openings in the inactive or active portions of display 14) such as an opening to accommodate button 22 and an opening to accommodate speaker port 24.

Figure 3:
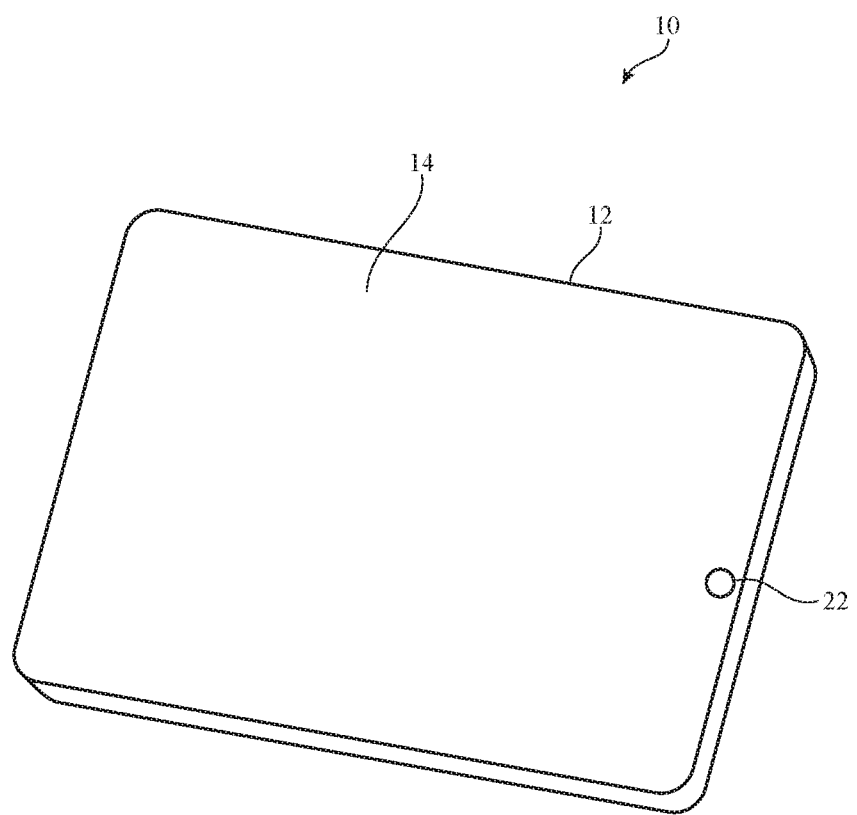
FIG. 3 is a perspective view of an illustrative electronic device such as a tablet computer having an ambient light adaptive display in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22.

Figure 4:
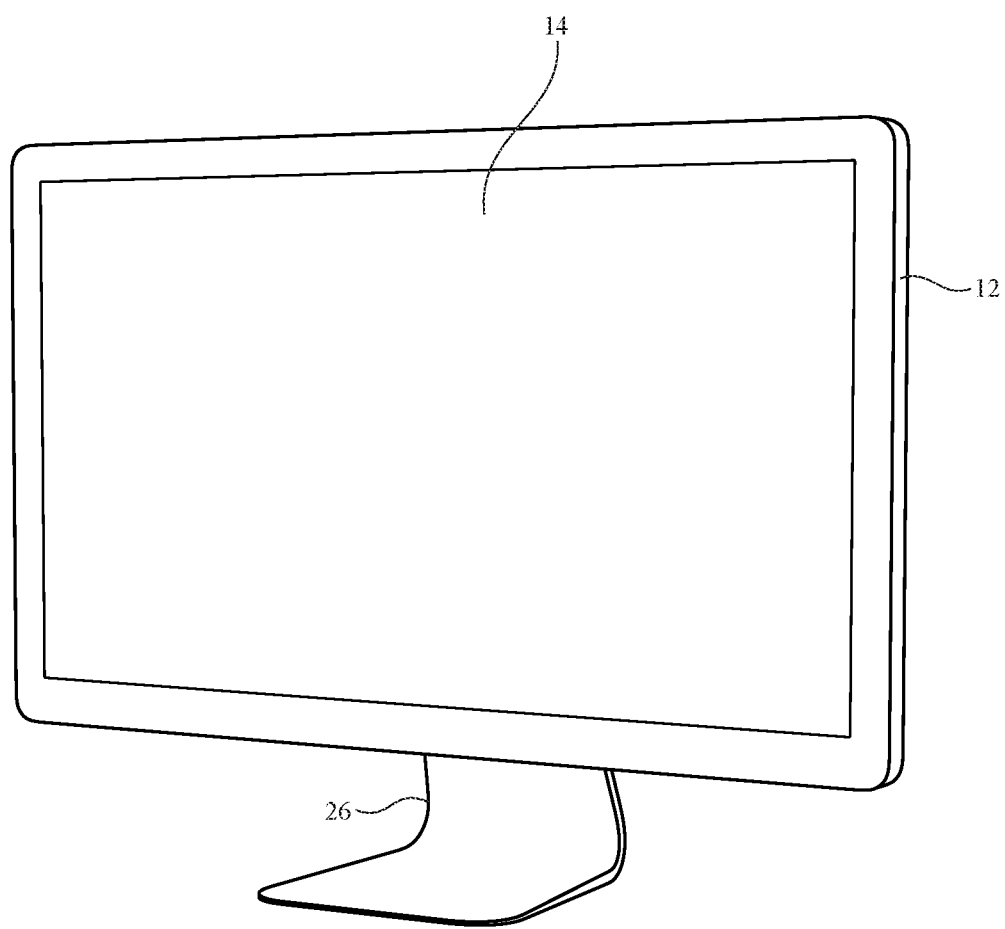
FIG. 4 is a perspective view of an illustrative electronic device such as a computer monitor with a built-in computer having an ambient light adaptive display in accordance with an embodiment of the present invention.

FIG. 4 is a perspective view of electronic device 10 in a configuration in which electronic device 10 has been implemented in the form of a computer integrated into a computer monitor. As shown in FIG. 4, display 14 may be mounted on a front surface of housing 12. Stand 26 may be used to support housing 12.

Figure 5:
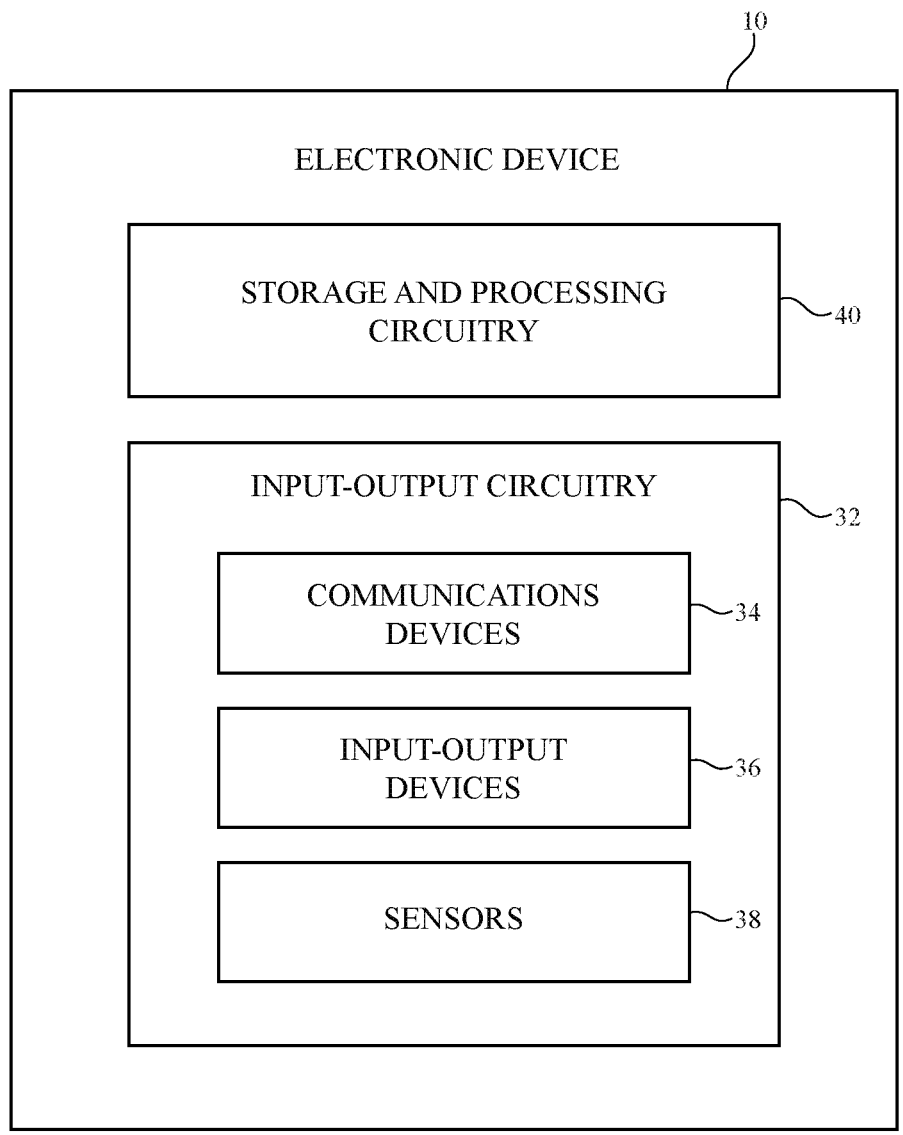
FIG. 5 is a schematic diagram of an illustrative system including an electronic device of the type that may be provided with an ambient light adaptive display in accordance with an embodiment of the present invention.

A schematic diagram of device 10 is shown in FIG. 5. As shown in FIG. 5, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on one or more microprocessors, microcontrollers, digital signal processors, baseband processor integrated circuits, application specific integrated circuits, etc.

With one suitable arrangement, storage and processing circuitry 40 may be used to run software on device 10 such as internet browsing applications, email applications, media playback applications, operating system functions, software for capturing and processing images, software implementing functions associated with gathering and processing sensor data, software that makes adjustments to display brightness and touch sensor functionality, etc.

To support interactions with external equipment, storage and processing circuitry 40 may be used in implementing communications protocols. Communications protocols that may be implemented using storage and processing circuitry 40 include internet protocols, wireless local area network protocols (e.g., IEEE 802.11 protocols—sometimes referred to as WiFi®), protocols for other short-range wireless communications links such as the Bluetooth® protocol, etc.

Input-output circuitry 32 may be used to allow input to be supplied to device 10 from a user or external devices and to allow output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 22 of FIG. 2, joysticks, click wheels, scrolling wheels, a touch screen (e.g., display 14 of FIG. 1, 2, 3, or 4 may be a touch screen display), other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user or for external equipment.

Sensor circuitry such as sensors 38 of FIG. 5 may include an ambient light sensor for gathering information on ambient light, proximity sensor components (e.g., light-based proximity sensors and/or proximity sensors based on other structures), accelerometers, gyroscopes, magnetic sensors, and other sensor structures. Sensors 38 of FIG. 5 may, for example, include one or more microelectromechanical systems (MEMS) sensors (e.g., accelerometers, gyroscopes, microphones, force sensors, pressure sensors, capacitive sensors, or any other suitable type of sensor formed using a microelectromechanical systems device).

Figure 6:
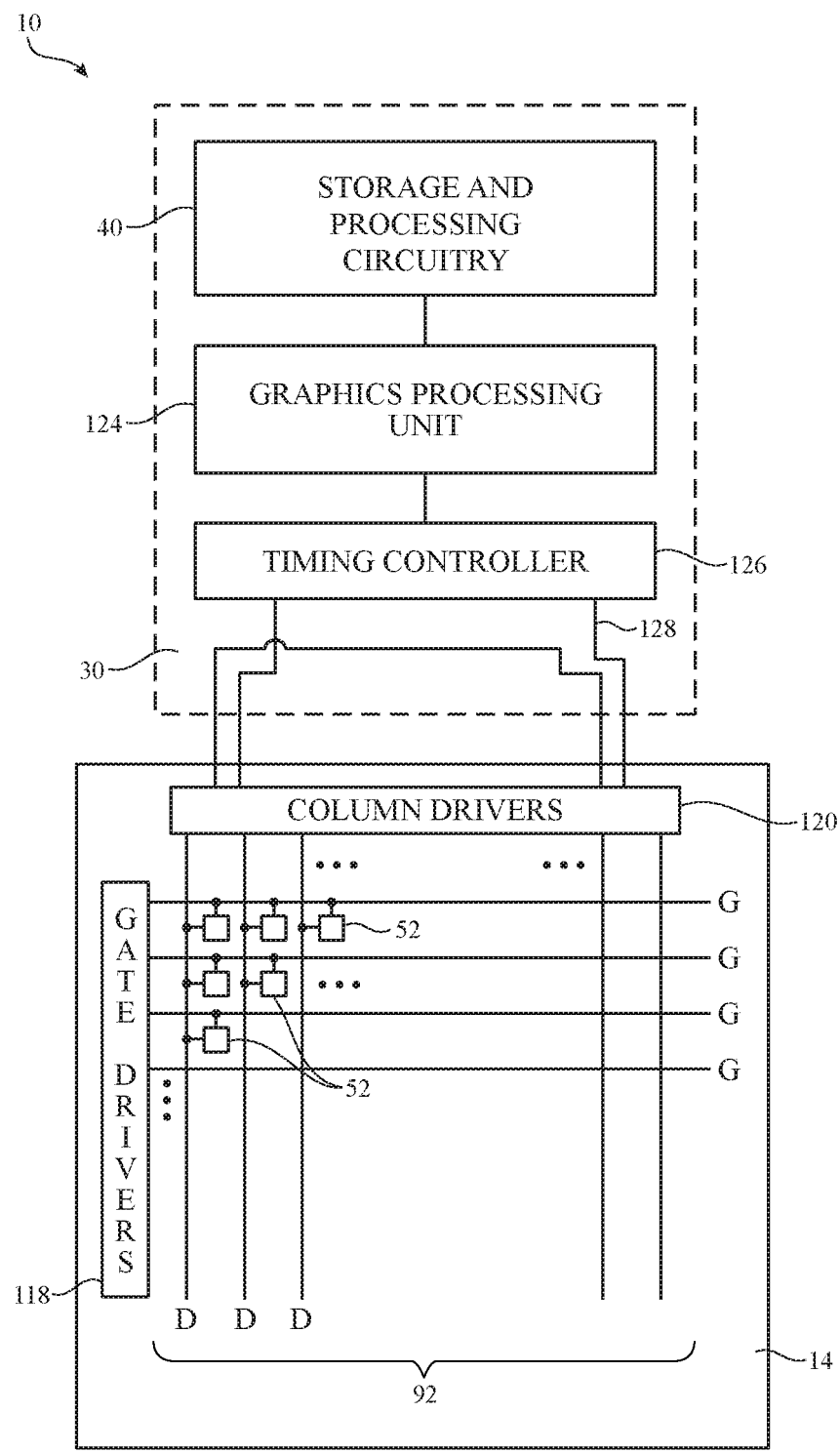
FIG. 6 is a schematic diagram of an illustrative electronic device having a display and display control circuitry in accordance with an embodiment of the present invention.

FIG. 6 is a diagram of device 10 showing illustrative circuitry that may be used in displaying images for a user of device 10 on pixel array 92 of display 14. As shown in FIG. 6, display 14 may have column driver circuitry 120 that drives data signals (analog voltages) onto the data lines D of array 92. Gate driver circuitry 118 drives gate line signals onto gate lines G of array 92. Using the data lines and gate lines, display pixels 52 may be configured to display images on display 14 for a user. Gate driver circuitry 118 may be implemented using thin-film transistor circuitry on a display substrate such as a glass or plastic display substrate or may be implemented using integrated circuits that are mounted on the display substrate or attached to the display substrate by a flexible printed circuit or other connecting layer. Column driver circuitry 120 may be implemented using one or more column driver integrated circuits that are mounted on the display substrate or using column driver circuits mounted on other substrates.

During operation of device 10, storage and processing circuitry 40 may produce data that is to be displayed on display 14. This display data may be provided to display control circuitry such as timing controller integrated circuit 126 using graphics processing unit 124.

Timing controller 126 may provide digital display data to column driver circuitry 120 using paths 128. Column driver circuitry 120 may receive the digital display data from timing controller 126. Using digital-to-analog converter circuitry within column driver circuitry 120, column driver circuitry 120 may provide corresponding analog output signals on the data lines D running along the columns of display pixels 52 of array 92.

Storage and processing circuitry 40, graphics processing unit 124, and timing controller 126 may sometimes collectively be referred to herein as display control circuitry 30. Display control circuitry 30 may be used in controlling the operation of display 14.

Pixels 52 may include color pixels such as red pixels, green pixels, blue pixels, white pixels, or pixels of another color. Color pixels may include color filter elements that transmit light of particular colors or color pixels may be formed from emissive elements that emit light of a given color.

In general, pixels 52 may include pixels of any suitable color. For example, pixels 52 may include a pattern of cyan, magenta, and yellow pixels, or may include any other suitable pattern of colors. Arrangements in which pixels 52 include a pattern of red, green, and blue pixels are sometimes described herein as an example.

Display control circuitry 30 and associated thin-film transistor circuitry associated with display 14 may be used to produce signals such as data signals and gate line signals for operating pixels 52 (e.g., turning pixels 52 on and off, adjusting the intensity of pixels 52, etc.). During operation, display control circuitry 30 may control the values of the data signals and gate signals to control the light intensity associated with each of the display pixels and to thereby display images on display 14.

Display control circuitry 30 may obtain red, green, and blue pixel values (sometimes referred to as RGB values or digital display control values) corresponding to the color to be displayed by a given pixel. The RGB values may be converted into analog display signals for controlling the brightness of each pixel. The RGB values (e.g., integers with values ranging from 0 to 255) may correspond to the desired pixel intensity of each pixel. For example, a digital display control value of 0 may result in an "off" pixel, whereas a digital display control value of 255 may result in a pixel operating at a maximum available power.

It should be appreciated that these are examples in which eight bits are dedicated to each color channel. Alternative embodiments may employ greater or fewer bits per color channel. For example, if desired, six bits may be dedicated to each color channel. With this type of configuration, RGB values may be a set of integers ranging from 0 to 64. Arrangements in which each color channel has eight bits are sometimes described herein as an example.

Display control circuitry 30 may store display identification data (e.g., extended display identification data) for communicating its display capabilities to a source device. For example, display identification data may be stored in timing controller integrated circuit 126 (or other memory device associated with display 14) and may be accessed by a source device such as graphics processing unit 124 and/or a central processing unit (e.g., processing circuitry 40 of FIG. 6). The source device may read the display identification data in timing controller 126 and may provide display data to display 14 based on the display capabilities described in the display identification data.

Display identification data stored in timing controller 126 may indicate the capabilities of display 14 such as native resolution, video timing information, color space characteristics, and other information. To communicate the color gamut of display 14 to graphics processing unit 124, display identification data stored in timing controller 126 may include primary color information. For example, the display identification data may include a red value, a green value, and a blue value, sometimes referred to herein as "color primaries," that together define the color gamut of display 14.

Color space information such as the color primaries that define the color gamut of display 14 and other information associated with the extended display identification data file may be stored in device 10 during manufacturing. The extended display identification data file in conventional displays includes fixed, predetermined primary color values associated with the color space used by the display. The display identification data in conventional displays does not take into account the variations in color capabilities from one display to another and can lead to inaccurate color rendering. To avoid color inaccuracies, display 14 may be provided with unit-specific display identification data. Rather than assuming a given set of primary values based on the designated color gamut and storing those values in a large number of displays, the color primaries of each display unit (e.g., each display 14) may be measured during manufacturing. The measured color primaries may be used to determine what color primaries should be programmed in the extended display identification data file and stored in device 10.

Figure 7:
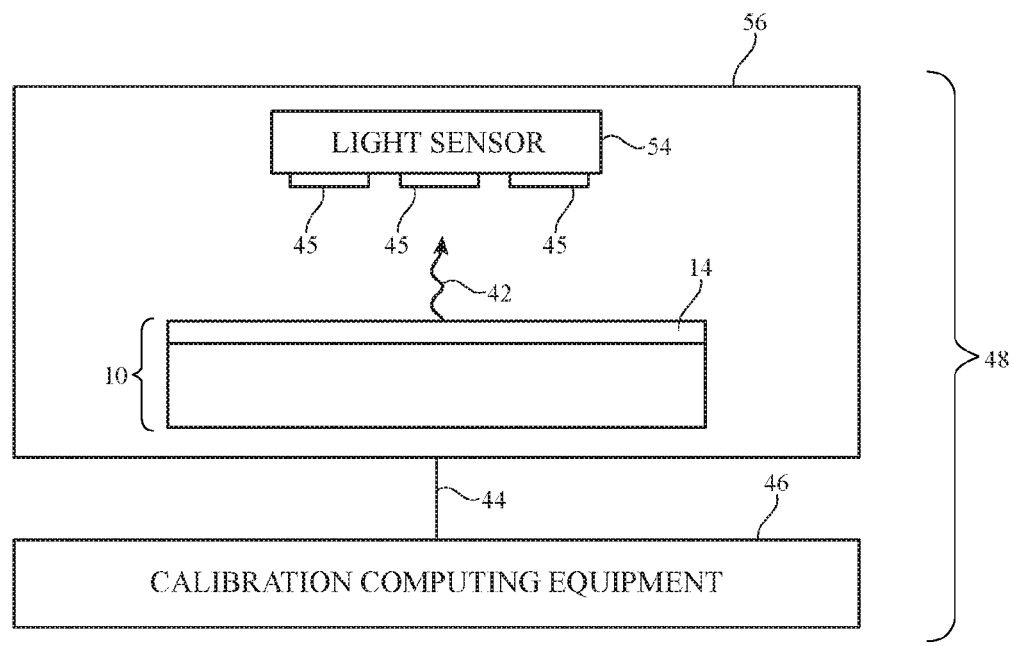
FIG. 7 is a diagram of an illustrative calibration system for performing display calibration including calibration computing equipment and a test chamber having a light sensor in accordance with an embodiment of the present invention.

FIG. 7 is a diagram of an illustrative calibration system that may be used to determine display-specific display identification data for a display such as display 14 of device 10. As shown in FIG. 7, calibration system 48 may include calibration computing equipment 46 that is coupled to test apparatus such as test chamber 56. Calibration computing equipment 46 may include one or more computers, one or more databases, one or more displays, one or more technician interface devices (e.g., keyboards, touch-screens, joysticks, buttons, switches, etc.) for technician control of calibration computing equipment 46, communications components or other suitable calibration computing equipment.

Calibration computing equipment 46 may be coupled to test chamber 56 using a wired or wireless communications path such as path 44.

Test chamber 56 may include a light sensor such as light sensor 54. Light sensor 54 may include one or more light-sensitive components such as light-sensitive components 45 for gathering display light 42 emitted by display 14 during calibration operations. Light-sensitive components 45 may include, for example, colorimetric light-sensitive components and/or spectrophotometric light-sensitive components that are configured to gather colored light from display 14.

Light sensor 54 may, for example, be a colorimeter having one or more light-sensitive components 45 corresponding to each set of colored pixels in display 14. For example, a display having red, green, and blue display pixels may be calibrated using a light sensor having corresponding red, green, and blue light-sensitive components 45. This is, however, merely illustrative. A display may include display pixels for emitting colors other than red, green, and blue, and light sensor 54 may include light-sensitive components 45 sensitive to colors other than red, green, and blue, may include white light sensors, or may include spectroscopic sensors.

Test chamber 56 may, if desired, be a light-tight chamber that prevents outside light (e.g., ambient light in a testing facility) from reaching light sensor 54 during calibration operations.

During calibration operations, device 10 may be placed into test chamber 56 (e.g., by a technician or by a robotic member). Calibration computing equipment 46 may be used to operate device 10 and light sensor 54 during calibration operations. For example, calibration computing equipment 46 may issue a command (e.g., by transmitting a signal over path 44) to device 10 to operate some or all pixels of display 14.

Calibration computing equipment 46 may operate light sensor 54 to measure the light emitted from display 14 while device 10 operates the pixels of display 14 to emit different colors of light. For example, light sensor 54 may measure a red color value while only the red pixels of display 14 emit light, a green color value while only the green pixels of display 14 emit light, and a blue color value while only the blue pixels of display 14 emit light. The measured red, green, and blue values may sometimes be referred to as the native RGB color primaries of display 14 because the measurements are gathered before display 14 is calibrated. This is, however, merely illustrative. If desired, color primaries of display 14 may be measured after display 14 has been calibrated or partially calibrated.

Color data measured by light sensor 54 may be provided to calibration computing equipment 46 over path 44. Calibration computing equipment 46 may process the measured color primary information from light sensor 54 to determine the color primaries that should be programmed into the extended display identification data file for display 14. This may include, for example, determining whether the native RGB color primaries of display 14 are within a target color gamut for display 14.

The example of FIG. 7 in which calibration computing equipment 46 is used to operate device 10 during calibration operations is merely illustrative. If desired, control circuitry within device 10 may run calibration sequences (e.g., may display a series of color patches or other suitable images) which are measured by light sensor 54.

Figure 8:
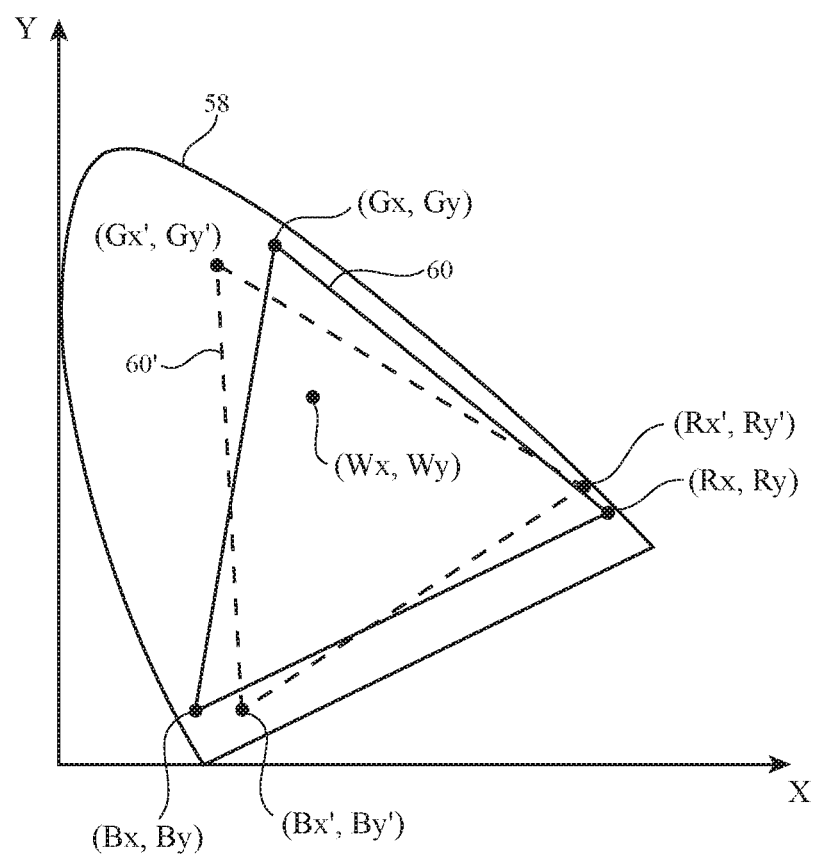
FIG. 8 is a chromaticity diagram showing how the native color gamut of a display may be different from a target color gamut in accordance with an embodiment of the present invention.

A chromaticity diagram illustrating how color information in the display identification data file may be determined is shown in FIG. 8. The chromaticity diagram of FIG. 8 illustrates a two-dimensional projection of a three-dimensional color space. The color generated by a display such as display 14 may be represented by chromaticity values x and y. The chromaticity values may be computed by transforming, for example, three color intensities (e.g., intensities of colored light emitted by a display) such as intensities of red, green, and blue light into three tristimulus values X, Y, and Z and normalizing the first two tristimulus values X and Y (e.g., by computing $x=X/(X+Y+Z)$ and $y=Y/(X+Y+Z)$ to obtain normalized x and y values). Transforming color intensities into tristimulus values may be performed using transformations defined by the International Commission on Illumination (CIE) or using any other suitable color transformation for computing tristimulus values.

Any color generated by a display may therefore be represented by a point (e.g., by chromaticity values x and y) on a chromaticity diagram such as the diagram shown in FIG. 8. Bounded region 58 of FIG. 8 represents the limits of visible light that may be perceived by humans (i.e., the total available color space). The colors that may be generated by a display (sometimes referred to as the color gamut of a display) are contained within a sub-region of color space 58. In the example of FIG. 8, bounded region 60 is one illustrative color gamut that may be used by display 14. Color gamut 60 may be the DCI P3 color space, sRGB color space, the Adobe RGB color space, or other suitable color space.

A color gamut may be defined by a set of primary color values and a white point value. For example, color gamut 60 may be defined by a green primary color value having chromaticity coordinates (Gx, Gy), a red primary color value having chromaticity coordinates (Rx, Ry), a blue primary value having chromaticity coordinates (Bx, By), and a white point value having chromaticity coordinates (Wx, Wy).

Due to manufacturing variations and other factors, the color capabilities of one display operating in a given color space (e.g., color space 60) may be different from the color capabilities of another display operating in the same color space. For example, the color primaries of one display may be equal or nearly equal to the color primaries of color space 60, while the color primaries of another display may be offset from those of color space 60. For example, display 14 may have a native color gamut such as color gamut 60' of FIG. 8. Color gamut 60' may be defined by a green primary color value having chromaticity coordinates (Gx', Gy'), a red primary color value having chromaticity coordinates (Rx', Ry'), and a blue primary value having chromaticity coordinates (Bx', By').

In some scenarios, the difference between the color primaries of native color gamut 60' of display 14 and the color primaries of target color space 60 may not be noticeable to the human eye. In these scenarios, the color primaries programmed into the display identification data for display 14 may be the color primaries of target color gamut 60 or the color primaries of native color gamut 60', since the human eye will not be able to differentiate between the different color primaries.

In other scenarios, the difference between the color primaries of native color gamut 60' of display 14 and the color primaries of target color gamut 60 may be noticeable to the human eye. In these scenarios, the color primaries programmed into the display identification data may be different than the color primaries associated with target color gamut 60'.

If desired, calibration computing equipment 46 of FIG. 7 may determine display identification data for each display on a unit-by-unit basis. For example, calibration computing equipment may measure the native RGB color primaries (Rx', Ry'), (Gx', Gy'), and (Bx', By') of display 14 using light sensor 54 and may compare the native RGB color primaries with the target color primaries to determine the final color primaries that are programmed into the extended display identification data file.

If calibration computing equipment 46 determines that the native RGB color primaries of display 14 are within target color gamut 60, calibration computing equipment 46 may use the target RGB color primaries (Rx, Ry), (Gx, Gy), and (Bx, By) in the display identification data file for display 14. If, on the other hand, calibration computing equipment 46 determines that the native RGB color primaries of display 14 are outside of target color gamut 60 (and that the difference between the native color primaries and the target color primaries is greater than a threshold), calibration computing equipment 46 may use different RGB primaries in the display identification data file for display 14. This type of unit-specific display identification data may allow display 14 to communicate more accurate information about its color gamut to a source device.

Figure 9A:
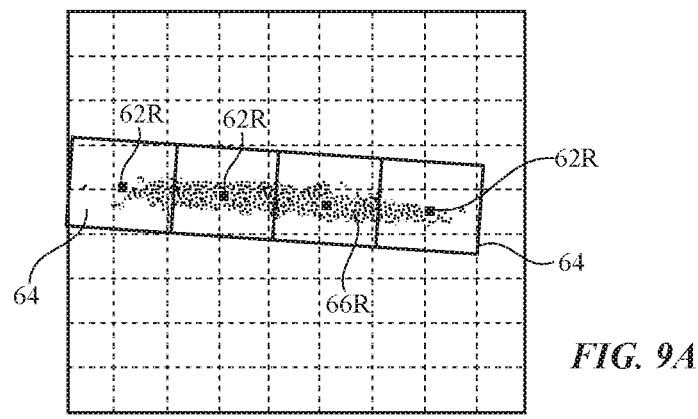
FIGS. 9A, 9B, and 9C show illustrative color data that may be used to determine extended display identification data for a given display in accordance with an embodiment of the present invention.
Figure 9B:
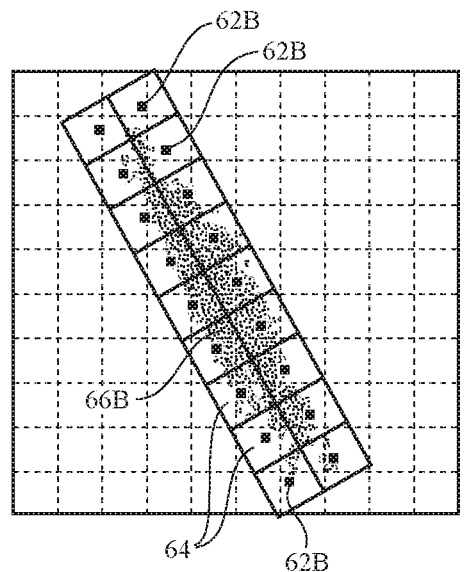
Figure 9C:
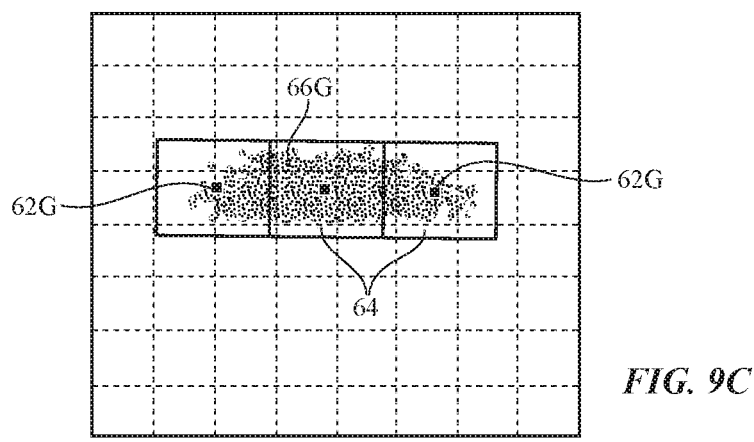

In one illustrative arrangement, the native RGB color primaries of display 14 may be used in the display identification data file for display 14. In another illustrative arrangement, each color primary value used in the display identification file may be selected based on a bin of previously measured color values in which the native color primary value is located. FIGS. 9A, 9B, and 9C illustrate how binning may be used to determine RGB color primaries for a display identification data file.

As shown in FIG. 9A, red color data 66R gathered from a number of displays may be distributed across multiple bins 64. Each bin 64 may have a representative value 62R corresponding to the chromaticity coordinates assigned to that bin. As shown in FIG. 9B, blue color data 66B gathered from a number of displays may be distributed across multiple bins 64. Each bin 64 may have a representative value 62B corresponding to the chromaticity coordinates assigned to that bin. In FIG. 9C, green color data 66G gathered from a number of displays may be distributed across multiple bins 64. Each bin 64 may have a representative value 62G corresponding to the chromaticity coordinates assigned to that bin. If desired, representative values 62R, 62B, and 62G may correspond to the color coordinates at the center of each bin.

As shown in FIGS. 9A, 9B, and 9C, the number and size of bins associated with each color may be different for different colors. For example, colors that exhibit greater variance from one display to another may be assigned a greater number of bins and/or bins of smaller size. This is, however, merely illustrative. If desired, the number and size of bins may be the same for red, green, and blue colors.

Previously gathered color data from a number of different displayers such as the color data of FIGS. 9A, 9B, and 9C may be used by display calibration data 46 when determining the color primaries to program into the display identification data file for display 14. For example, if calibration computing equipment 46 determines that the native red color primary of display 14 is outside of target color gamut 60 (and that the difference between the native red color primary and the target red color primary is greater than a threshold), calibration computing equipment 46 may determine which bin 64 the measured red color primary is located in. Calibration computing equipment 46 may use the representative value 62R from that bin as the red color primary value in the display identification data file for display 14. A similar process may be performed to determine the green and blue color primary values for the display identification data file.

Figure 10:
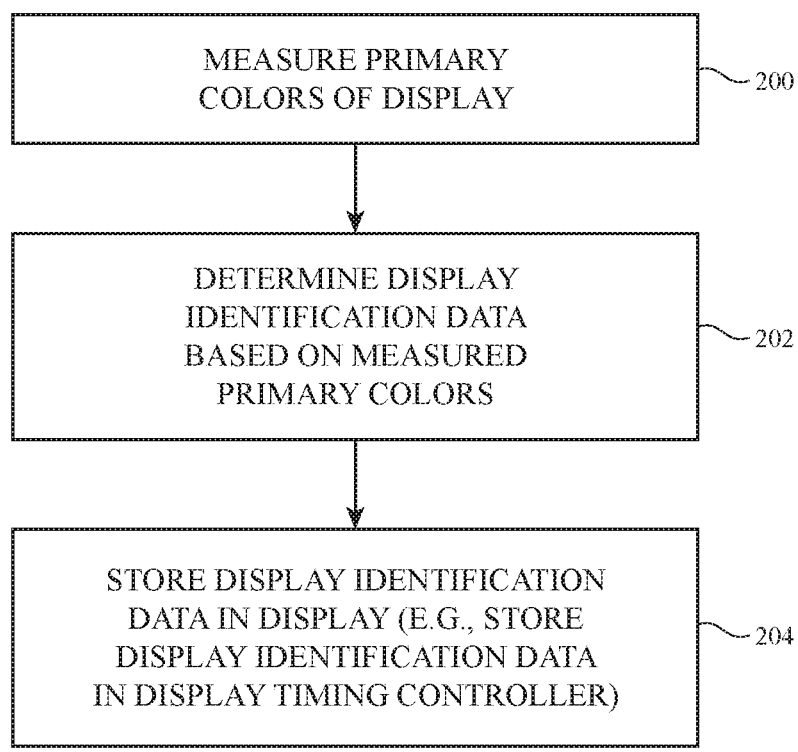
FIG. 10 is a flow chart of illustrative steps involved in providing a display with unit-specific display identification data using a stand-alone process in accordance with an embodiment of the present invention.

FIG. 10 is a flow chart of illustrative steps involved in providing a display such as display 14 with unit-specific display identification data. In the example of FIG. 10, the display identification data update process may be a stand-alone process that is performed during manufacturing (e.g., before or after gamma calibration, before or after white point calibration, etc.).

At step 200, calibration computing equipment 46 may gather primary color measurements from display 14 using light sensor 54. This may include, for example, determining the native RGB color primaries (Rx', Ry'), (Gx', Gy'), and (Bx', By') of display 14 by measuring red light emitted from display 14, green light emitted from display 14, and blue light emitted from display 14.

At step 202, calibration computing equipment 46 may determine display identification data for display 14 based on the measured RGB color primaries. This may include, for example, generating an extended display identification data file with the native RGB color primaries, the target RGB color primaries, or RGB color primaries based on binned color data (as described in connection with FIGS. 9A, 9B, and 9C).

At step 204, calibration computing equipment 46 may store the extended display identification data in display 14. This may include, for example, storing extended display identification data file in the display timing controller 126 or other memory associated with display 14.

If desired, a verification step may be performed after step 204 in which calibration computing equipment 46 gathers display data while display 14 operates with the stored display identification data. The verification step may be performed to verify whether the display identification data was properly stored in electronic device 10 and whether the performance and color characteristics of display 14 match the desired target characteristics.

Figure 11:
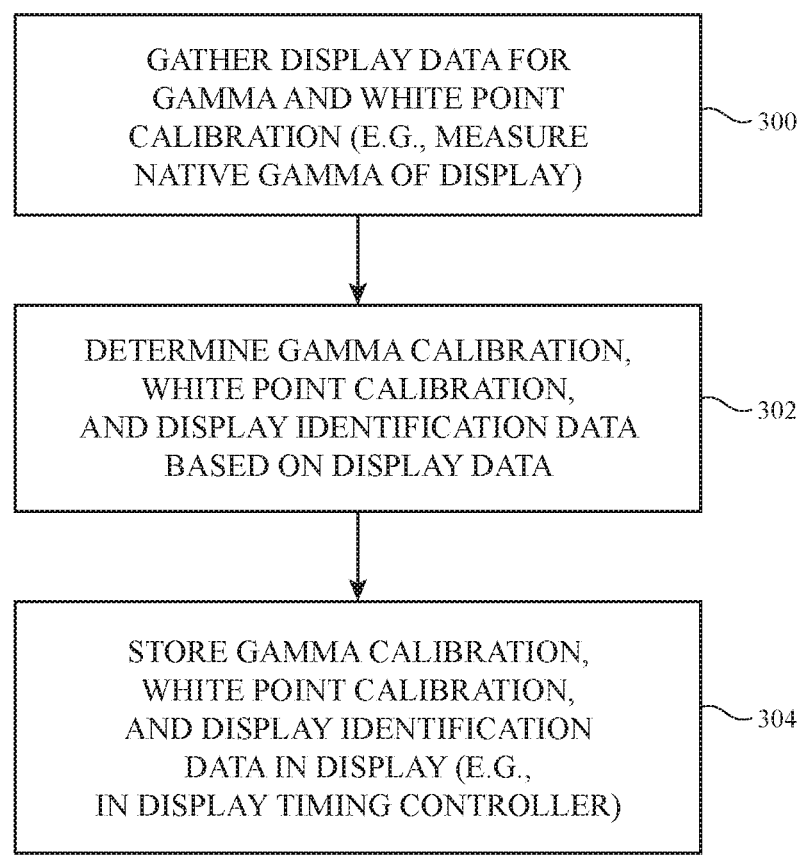
FIG. 11 is a flow chart of illustrative steps involved in providing a display with unit-specific display identification data using a process that is integrated with gamma calibration and white point calibration operations in accordance with an embodiment of the present invention.

If desired, the display identification data update process may be integrated with an existing calibration process such as gamma calibration and/or white point calibration. A flow chart of illustrative steps involved in providing display 14 with unit-specific display identification data during a calibration process is shown in FIG. 11.

At step 300, calibration computing equipment 46 may gather display data such as native gamma information from display 14 using light sensor 54. This may include, for example, measuring brightness levels of display 14 while the pixels of display 14 are driven at different voltages.

At step 302, calibration computing equipment 46 may determine gamma calibration data, white point calibration data, and display identification data based on the display data gathered in step 300. To determine display identification data for display 14, calibration computing equipment 46 may extract the native RGB color primaries of display 14 from the measured gamma information and may determine display identification data for display 14 based on the extracted RGB color primaries. Calibration computing equipment 46 may generate an extended display identification data file with the native RGB color primaries, the target RGB color primaries, or RGB color primaries based on binned color data (as described in connection with FIGS. 9A, 9B, and 9C).

At step 306, calibration computing equipment 46 may store the gamma calibration data, the white point calibration data, and the display identification data in display 14. This may include, for example, storing the extended display identification data file in the display timing controller 126.

If desired, a verification step may be performed after step 306 in which calibration computing equipment 46 gathers display data while display 14 operates with the stored display identification data and the additional calibration data (e.g., gamma and white point calibration data). The verification step may be performed to verify whether the display identification data was properly stored in electronic device 10 and whether the performance and color characteristics of display 14 match the desired target characteristics.

Figure 12:
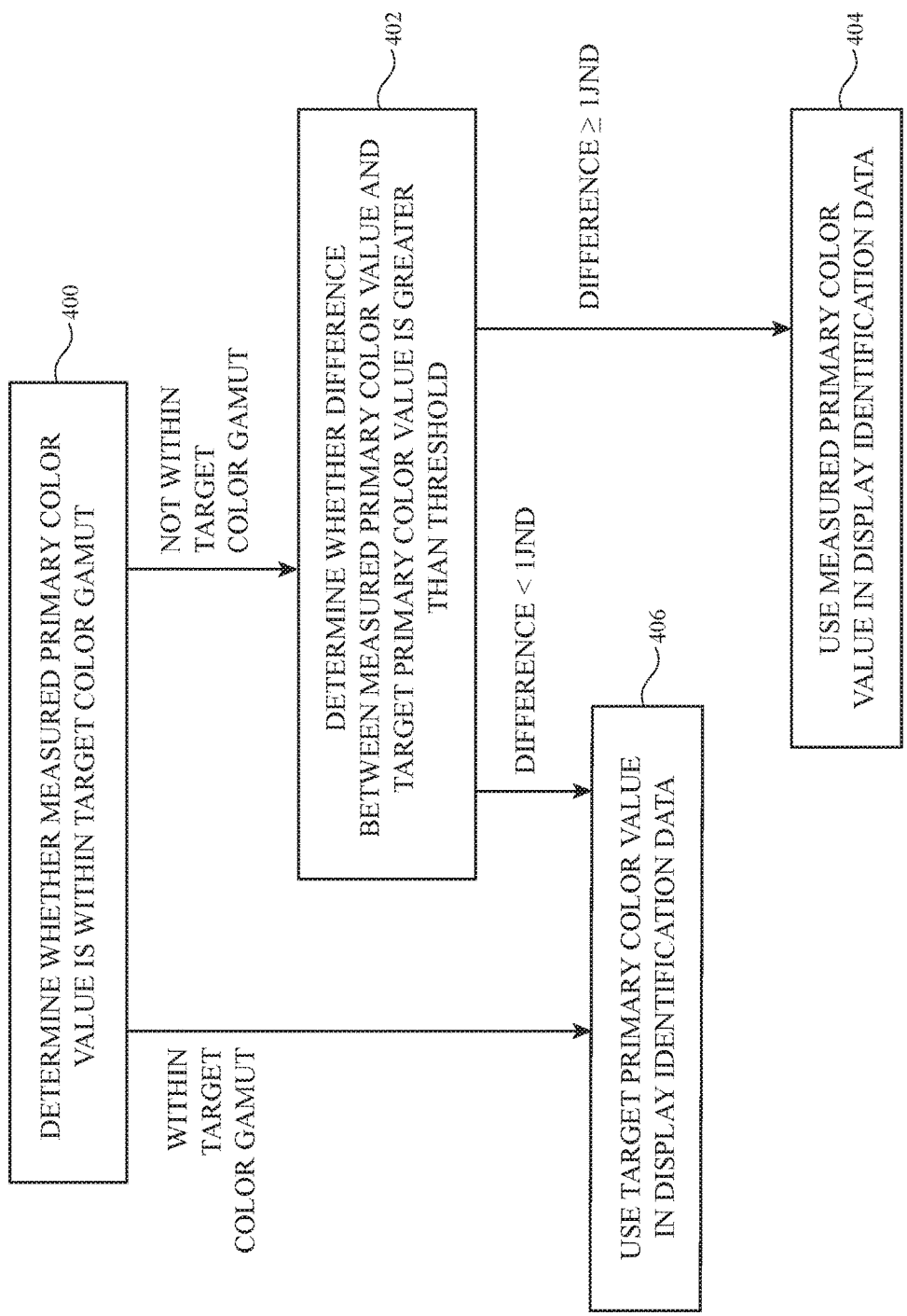
FIG. 12 is a flow chart of illustrative steps involved in determining unit-specific display identification data for a display in accordance with an embodiment of the present invention.

FIG. 12 is a flow chart of illustrative steps involved in determining unit-specific display identification data for a display such as display 14 (e.g., as described in step 202 of FIGS. 10 and 302 of FIG. 11).

At step 400, calibration computing equipment 46 may determine whether a measured primary color of display 14 is within the target color gamut. This may include, for example, determining whether the measured red value (Rx', Ry') is within target color gamut 60 of FIG. 8. The target color gamut may be the DCI P3 color gamut, the sRGB color gamut, the Adobe RGB color gamut, or other suitable color gamut. If the measured primary color value is not within the target color gamut, processing may proceed to step 402.

At step 402, calibration computing equipment 46 may determine whether the difference between the measured primary color value and the target primary color value is greater than a threshold. The threshold may, for example, be equal to 1 just-noticeable difference (JND) unit, where JND is determined using the following equation:

$$JND = \frac{\sqrt{(u' - u_0)^2 - (v' - v_0)^2}}{.004} \quad (1)$$

$$\text{where } u' = \frac{4x}{-2x + 12y + 3} \text{ and } v' = \frac{9y}{-2x + 12y + 3} \quad (2)$$

and where x and y are the chromaticity coordinates of the measured primary color and $u_0$ and $v_0$ correspond to the coordinates of the target primary color. The JND equations above are merely illustrative. If desired, other JND formulas may be used such as the International Commission on Illumination distance metric (sometimes referred to as the CIE ΔE or Delta E metric). If the difference between the target primary color and the measured primary color is greater than 1 JND, processing may proceed to step 404.

At step 404, calibration computing equipment 46 may program the measured primary color into the display identification data file. For example, if x and y are the chromaticity coordinates of the measured primary color, then (x,y) may be programmed into the extended display identification data file for display 14.

If it is determined at step 400 that the measured primary color value is within the target color gamut or if it is determined at step 402 that the difference between the primary color value and the target color value is less than the just-noticeable difference threshold, processing may proceed to step 406.

At step 406, calibration computing equipment 46 may program the target primary color value into the display identification data file. For example, if $x_0$ and $y_0$ are the chromaticity coordinates of the target primary color, then $(x_0,y_0)$ may be programmed into the extended display identification data file for display 14.

The process of FIG. 12 may be repeated for each primary color (e.g., red, green, and blue) to determine RGB color primaries for the display identification data file.

In some scenarios, it may be desirable to use the measured primary color value in the display identification data even when the native primary color value is noticeably different from the target color value. For example, if care is not taken, blue colors can appear magenta when a given calibration operation is applied to the blue channel. If desired, an additional step may be performed following step 402 to determine whether the measured primary color is in a given region of a color space (e.g., a color region which is known to be problematic post-calibration). If the measured color is in the problem region, the measured primary color value may be used in the display identification data.

Figure 13:
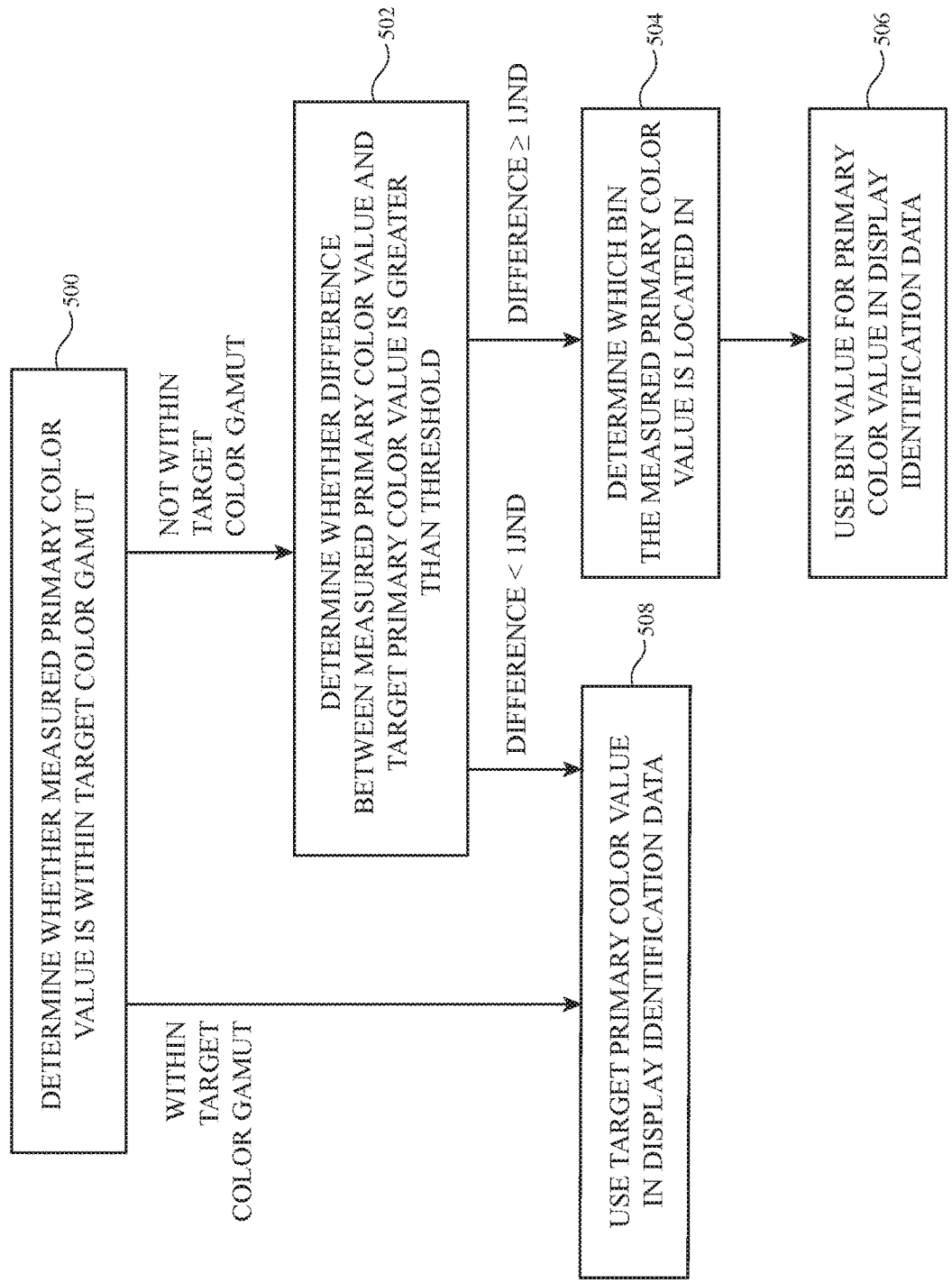
FIG. 13 is a flow chart of illustrative steps involved in determining unit-specific display identification data for a display in accordance with another embodiment of the present invention.

FIG. 13 is a flow chart of illustrative steps involved in another suitable method for determining unit-specific display identification data for a display such as display 14 (e.g., as described in step 202 of FIG. 10 and 302 of FIG. 11).

At step 500, calibration computing equipment 46 may determine whether a measured primary color of display 14 is within the target color gamut. This may include, for example, determining whether the measured red value (Rx', Ry') is within target color gamut 60 of FIG. 8. The target color gamut may be the DCI P3 color gamut, the sRGB color gamut, the Adobe RGB color gamut, or other suitable color gamut. If the measured primary color value is not within the target color gamut, processing may proceed to step 502.

At step 502, calibration computing equipment 46 may determine whether the difference between the measured primary color value and the target primary color value is greater than a threshold. The threshold may, for example, be equal to 1 just-noticeable difference (JND) unit, where JND is determined using equations (1) and (2) above. If the difference between the target primary color and the measured primary color is greater than 1 JND, processing may proceed to step 504.

At step 504, calibration computing equipment 46 may determine which bin (e.g., which bin of bins 62 of FIG. 9A, 9B, or 9C) the measured data point is located in. As described in connection with FIGS. 9A, 9B, and 9C, the bins may be based on the distribution of previously gathered color data from a number of different displays.

At step 506, calibration computing equipment 46 may program the bin value associated with the bin determined in step 504 into the display identification data file. For example, if x and y are the chromaticity coordinates at the center of the bin determined in step 504, then (x,y) may be programmed into the extended display identification data file for display 14.

If it is determined at step 500 that the measured primary color value is within the target color gamut or if it is determined at step 502 that the difference between the primary color value and the target color value is less than the just-noticeable difference threshold, processing may proceed to step 508.

At step 508, calibration computing equipment 46 may program the target primary color value into the display identification data file. For example, if $x_0$ and $y_0$ are the chromaticity coordinates of the target primary color, then $(x_0,y_0)$ may be programmed into the extended display identification data file for display 14.

The process of FIG. 13 may be repeated for each primary color (e.g., red, green, and blue) to determine RGB color primaries for the display identification data file.

If desired, an additional step may be performed following step 502 to determine whether the measured primary color is in a given region of a color space (e.g., a region which is known to be problematic post-calibration). If the measured color is in the problem region, the target primary color value may be used in the display identification data instead of the bin color value.

The foregoing is merely illustrative of the principles of this invention and various modifications can be made by those skilled in the art without departing from the scope and spirit of the invention. The foregoing embodiments may be implemented individually or in any combination.

The invention claimed is:

1. A method for calibrating a display during manufacturing, comprising:
   with a light sensor, measuring a primary color value of the display;
   with calibration computing equipment, determining whether the measured primary color value is within a target color gamut; and
   with the calibration computing equipment, generating extended display identification data based on whether the measured primary color value of the display is within the target color gamut, wherein generating the extended display identification data comprises storing the measured primary color value in an extended display identification data file when the measured primary color value is outside of the target color gamut by an amount larger than a predetermined threshold.

2. The method defined in claim 1 wherein the extended display identification data comprises first, second, and third color values and wherein generating the extended display identification data comprises determining the first color value based on whether the measured primary color value of the display is within the target color gamut.

3. The method defined in claim 2 wherein determining whether the measured primary color value is within the target color gamut comprises determining that the measured primary color value is outside of the target color gamut.

4. The method defined in claim 3 wherein the target color gamut is defined by first, second, and third target primary color values, the method further comprising:
   in response to determining that the measured primary color value is outside of the target color gamut, determining whether a difference between the measured primary color value and the first target primary color value is greater than the predetermined threshold.

5. The method defined in claim 4 further comprising:
   in response to determining that the difference between the measured primary color value and the first target primary color value is greater than the predetermined threshold, determining the first color value in the extended display identification data to be equal to the measured primary color value.

6. The method defined in claim 4 further comprising:
   in response to determining that the difference between the measured primary color value and the first target primary color value is greater than the predetermined threshold, determining which color bin out of a plurality of color bins the measured primary color value is located in.

7. The method defined in claim 6 wherein the plurality of color bins is based on previously gathered color data from a plurality of displays.

8. The method defined in claim 1 wherein the extended display identification data comprises first, second, and third color values and wherein generating the extended display identification data comprises determining the first color value to be equal to the measured primary color value when the measured primary color value of the display is not within the target color gamut, the method further comprising:
   with the light sensor, measuring two additional primary color values of the display;
   with the calibration computing equipment, determining whether the two additional measured primary color values are within the target color gamut; and
   with the calibration computing equipment, determining the second and third color values based on whether the two additional measured primary color values are within the color gamut.

9. The method defined in claim 8 wherein the first, second, and third color values comprise chromaticity coordinates for a red channel, chromaticity coordinates for green channel, and chromaticity coordinates for a blue channel.

10. The method defined in claim 1 wherein the target color gamut is a DCI P3 color gamut.

11. The method defined in claim 1 further comprising:
    storing the extended display identification data in the display.

12. A method for calibrating a display during manufacturing, comprising:
    with calibration computing equipment, gathering gamma information from the display;
    extracting primary color information from the gamma information, wherein the primary color information comprises a first measured primary color value, a second measured primary color value, and a third measured primary color value; and
    generating extended display identification data based on the extracted primary color information, wherein generating the extended display identification data comprises storing the first measured primary color value, the second measured primary color value, and the third measured primary color value in an extended display identification data file when the first, second, and third measured primary color values are outside of a target color space by an amount larger than a threshold.

13. The method defined in claim 12 wherein the first, second, and third measured primary color values comprise a red value, a green value, and a blue value, the method further comprising:
    storing the extended display identification data in the display.

14. The method defined in claim 12 further comprising:
    determining whether the first, second, and third measured primary color values are within the target color space.

15. The method defined in claim 14 wherein generating the extended display identification data comprises generating the extended display identification data based on whether the first, second, and third measured primary color values are within the target color space.

16. A display that displays colors within a color gamut defined by first, second, and third primary color values, comprising:
    an array of display pixels; and a timing controller that provides digital display data to the array of display pixels and that stores extended display identification data, wherein the extended display identification data includes first, second, and third measured primary color values that are outside of the color gamut by an amount larger than a threshold, wherein the first, second, and third measured primary color values in the extended display identification data are different than the first, second, and third primary color values that define the color gamut, and wherein the first, second, and third measured primary color values in the extended display identification data are based on color sensor measurements gathered during manufacturing.

17. The display defined in claim 16 wherein the color gamut comprises a DCI P3 color gamut.

18. The display defined in claim 16 wherein the first, second, and third measured primary color values in the extended display identification data comprise a red color value, a green color value, and a blue color value.

19. The display defined in claim 16 wherein the timing controller provides the extended display identification data to a graphics processing unit to communicate the color gamut of the display to the graphics processing unit.

* * * * *